Nov. 4, 1941.   R. W. LUCE ET AL   2,261,688
REFLECTOR DEVICE
Filed Nov. 26, 1938   2 Sheets-Sheet 1
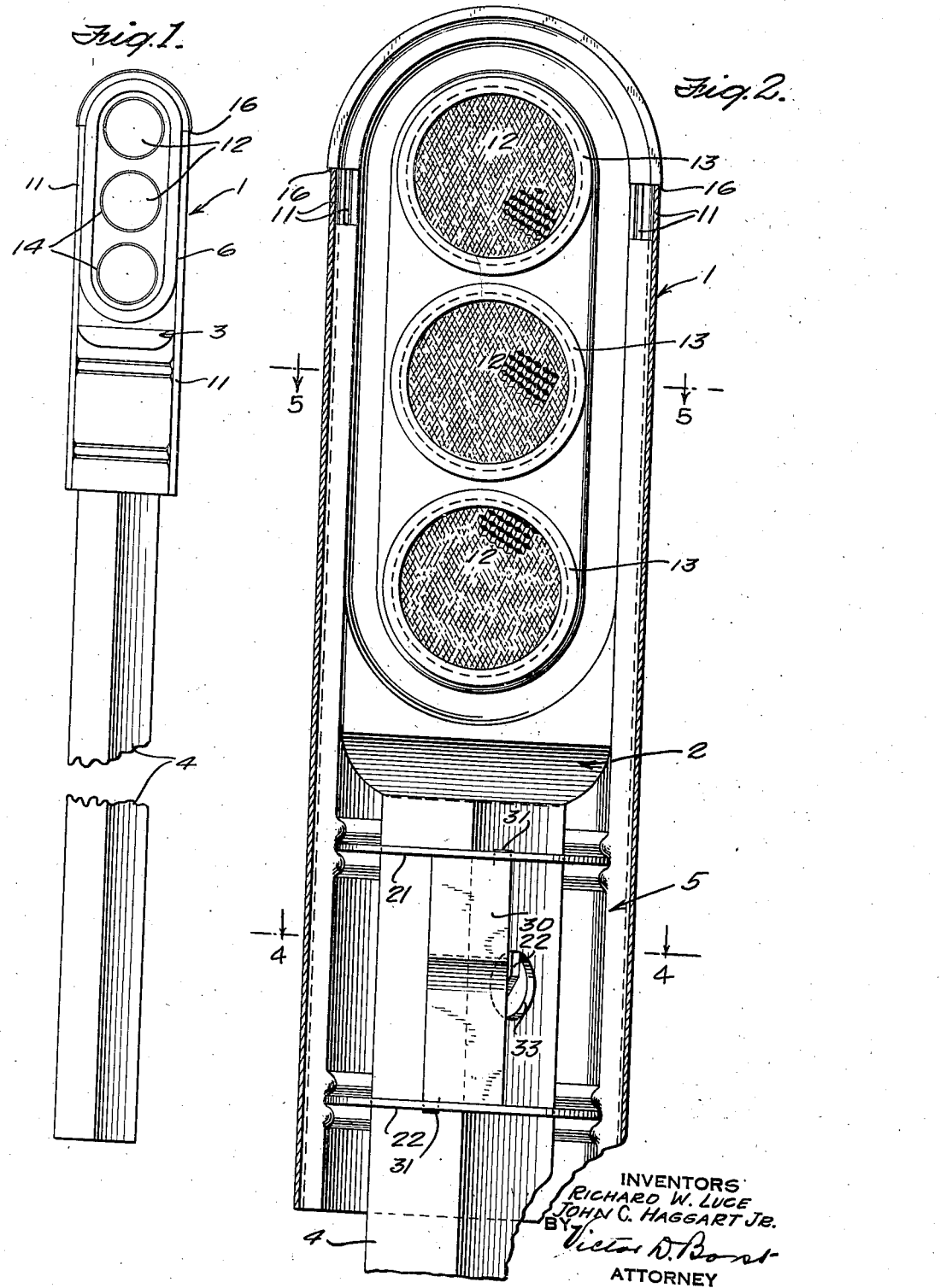
INVENTORS
RICHARD W. LUCE
JOHN C. HAGGART JR.
BY
ATTORNEY Nov. 4, 1941.   R. W. LUCE ET AL   2,261,688
REFLECTOR DEVICE
Filed Nov. 26, 1938   2 Sheets-Sheet 2
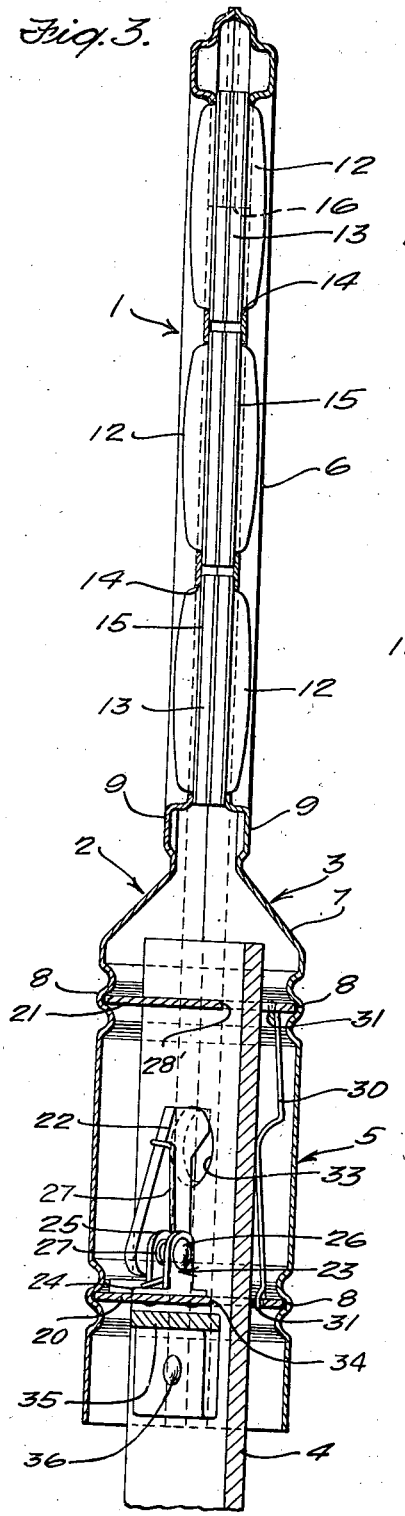
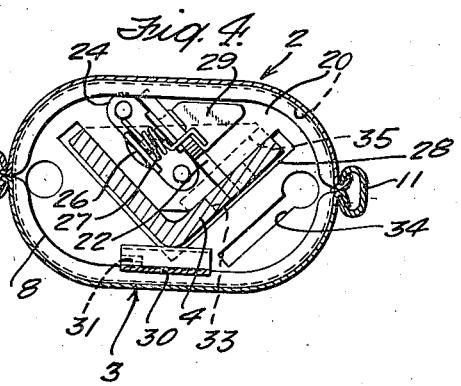
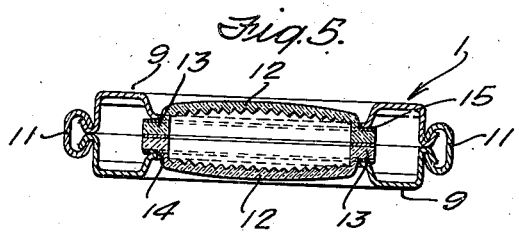
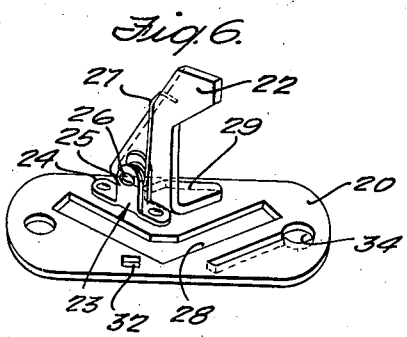
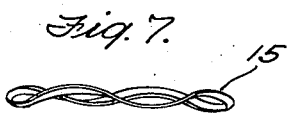
INVENTORS
RICHARD W. LUCE
JOHN C. HAGGART JR.
BY
ATTORNEY Patented Nov. 4, 1941

2,261,688

UNITED STATES PATENT OFFICE 2,261,688

REFLECTOR DEVICE

Richard W. Luce and John C. Haggart, Jr., Westfield, N. J., assignors to Signal Service Corporation, a corporation of Delaware Application November 26, 1938, Serial No. 242,456

4 Claims. (Cl. 88—78)

This invention relates to autocollimating reflecting devices, more particularly such devices used for road markers to indicate points of hazard or to give the motorist advance information of road contour or terrain.

These catoptric devices are designed to reflect the light impinging thereon at varying angles to the horizontal and vertical back towards the light source. A special form of catoptric device commonly in use is known as a "central triple reflector." The present invention is illustrated as embodied in connection with a central triple reflecting device but it will be understood as being independent of the particular type of autocollimating reflecting device used.

It is an object of the invention to provide an improved reflecting device of the autocollimating type, characterized by simplicity of construction, practicability, and economy of manufacture.

Another object is the provision of a reflecting unit composed of standard parts that may be assembled and disassembled expeditiously.

Another object of the invention is the provision of a plurality of reflecting units which may be assembled as a unitary structure and subsequently releasably but firmly secured to a support that may be installed independently of the reflector structure.

A special object is the provision of a reflector device of the above mentioned type, the entire assemblage of which, with the exception of the reflector units, may be made from metal stampings.

Other novel details of construction and the arrangement of parts which are exemplified in the accompanying drawings, and manifested from the following description are additional objects of the invention.

In accordance with the present invention there is provided a road marker composed of two separate structures adapted for ready attachment to, or separation from, each other. One of said structures is a standard to be firmly and permanently mounted at the edge of the roadway. The other of said structures, and which forms the principal subject matter of the present invention, is a reflector housing functioning as means for mounting a plurality of autocollimating reflector units in any desired arrangement, together with means for removably securing the housing to the aforesaid standard.

In the embodiment of the invention employed for the purpose of illustration, the said reflector housing comprises essentially a casing composed of two similar sections defining an upper and a lower compartment. In the lower compartment is arranged for easy access the means for removably attaching the housing to the aforesaid standard, and the upper compartment is arranged to receive and hold, in any desired grouping arrangement, preferably vertically, a plurality of double faced autocollimating reflectors.

In the accompanying drawings:

Fig. 1 is a front elevation of an embodiment of the invention;

Fig. 2 is a front elevation, on an enlarged scale, of the upper end of the structure shown in Fig. 1;

Fig. 3 is a side elevation, partly in section, of the structure shown in Fig. 2;

Fig. 4 is a section, taken on the line 4—4 of Fig. 2, showing the latching mechanism;

Fig. 5 is a section taken on the line 5—5 of Fig. 2;

Fig. 6 is a perspective view of the latching mechanism; and

Fig. 7 is a perspective view of the spring washer forming part of the lens assembly.

As will be seen from the drawings, more particularly Figs. 1 to 3, the reflector assembly comprises a housing, designated generally by the numeral 1 and composed of sections 2 and 3 which are duplicates of each other and may comprise stampings of sheet metal. The general contour of the housing formed by the sections 2 and 3, mounted to oppose each other, is generally rectangular in elevation and elliptical transversely, the lower portion having greater transverse dimension so as to provide a compartment 5 for mounting a latching mechanism and fastening means for securing the reflecting device to a standard 4, said construction being more fully described hereinafter. The upper portion 6 of the housing 1 has the general appearance of being rounded at the top, is flat and narrow and at the bottom tapers abruptly, by means of an outwardly inclined shoulder 7, into the latch compartment 5 open at the bottom. For the purpose of reinforcement, as well as matter of design, ribs 8 and 9 (see Figs. 4 and 5) are formed in portions 5 and 6 respectively of the housing 1; for similar reasons the longitudinal edges of sections 2 and 3 are rolled outwardly and when assembled abut each other so as to be interlocked by longitudinally and oppositely disposed U-shaped channel members 11. These members are made of resilient material such as sheet steel and are adapted to be sprung into place by sliding over the rolled or groove shaped edges of the sections 2 and 3, commencing from the bottom thereof and moving upwardly, said operation completing the assembly of the reflector unit. It will be noted that the upper part of the rolled longitudinal edges of sections 2 and 3 are provided with a cut-away portion forming stops 16 against which the channel members 11 abut, thus limiting their upward movement. It will also be noted that the edges comprising the upper top portion of each of sections 2 and 3 are not rolled outwardly to form grooves, but rather are turned substantially straight back so that their abutting surfaces fit flush and constitute a closure for the top of the housing 1.

The several reflecting units may each comprise a pair of reflecting disk members 12, each having an annular offset flange 13, and when the members 12 are mounted in the housing 1, these flanges oppose each other. The reflector disk members 12 may be made from a single piece of glass or other suitable plastic material preferably non-shatterable, which may be molded by use of a suitable matrix, so as to constitute an integral prismatic structure composed of a series of total reflecting surfaces arranged in contiguous relation and relatively at right angles and collectively around the axis thereof so as to form central triple reflectors. As mentioned above, reflectors of this type are well known in the art, and as such form no part of the present invention. However, the present mounting of the reflector units is believed to be novel.

It will be noted from the drawings that the reflecting disks 12 are positioned with their reflecting surfaces opposing each other and their respective flanges 13 in engagement, thus making the reflectors double faced. Interposed between the flanges 13 is a gasket which may be a disc of paper or other suitable material. The diameter of the disk members 12 is such that they fit into circular apertures 14 formed in the sections 2 and 3 of the housing 1, and the depth of the offset of the flanges 13 is sufficient to permit the protrusion of said reflector members 12 through said apertures 14, the flanges 13 seating upon the adjacent edge of the housing surrounding said apertures 14. It will be observed, however, that the projecting surface of each reflector disk 12 lies well within the protection of the rib 9 of each of sections 2 and 3 constituting the casing or housing 1. Interposed between the flange 13 and the abutting edge of the housing 1 is a spring washer 15, said washer being formed from resilient material crimped or corrugated to cause it to function as a spring washer and tightly but yieldingly hold the reflector elements in proper position when assembled.

To secure the reflector structure to the standard 4, which as shown may take the form of an angle iron, there is provided a pair of apertured metal plates 20 and 21 substantially duplicates and having the general configuration of the cross section of compartment 5 of the housing 1. These plates are relatively much heavier than the housing 1, and are adapted to fit snugly into the internal grooves resulting from forming the ribs 8, 8, so that when the reflector structure is assembled said plates are locked against displacement and afford substantial anchorage for attachment of the reflector structure to the standard 4. It will be observed that by this method of mounting the plates 20 and 21, they are parallel to and spaced apart from each other in the compartment 5, the plate 20 lies below the plate 21. The significance of this construction will be appreciated from the following description.

Mounted upon plate 20 is a latch mechanism comprising a detent 22 pivotally supported on a bracket 23. The bracket 23 may consist of a punching having a base portion 24 provided with upwardly extending arms 25 having apertures constituting bearings for a stud 26 passing through said arms 25 and extending laterally so as to provide pivoting means for the detent 22. Coiled about the stud 26, between the arms 25, is a spring 27 having one of its ends abutting against the base 24 of the bracket 23, and the other end hooked over the back edge of the detent 22. This provides a forward tension or bias to the detent 22, the forward movement of which is limited by an extension or foot 29 engaging with the plate 20 when the detent 22 is moved to normal or locking position under spring tension or when it functions as a bar to the removal of the housing 1 as hereinafter explained. The placement of the detent 22 on the base 20, is determined by the location of the L-shaped aperture 28, which accommodates the end of the standard 4, said aperture being but slightly larger than the thickness of angle iron from which said standard is made, thus insuring a relatively close fit between these parts.

Interposed between the plates 20 and 21 is a flat spring member 30 which is preferably preformed, as shown, and provided with prongs 31, one at each end thereof and severally adapted to register in apertures 32 of plates 20 and 21. A function of the spring member 30 is to insure intimate contact or engagement of the reflector housing 1 with the standard 4, thus preventing vibrations or loose connection between these units.

For locking the housing 1 to the standard 4, there is provided an aperture 33 so located on one of the sides and near the upper end of the standard that the detent will snap into the aperture when the housing reaches its proper disposition on the standard. The size of this aperture is sufficient comfortably to accommodate the end of the detent 22 which has its top edge flat, so that when said detent is pressed forward under the tension of spring 27, the tip thereof will slightly project through the aperture 33 and engage the upper edge thereof in locking relation in the event the housing 1 is attempted to be removed by an unauthorized person. That is to say, the location of the aperture 33 on the standard 4, and the placement of the bracket 23 with respect to the L-shaped aperture 28 are such that when the end of the standard 4 is properly inserted in the aperture 28, it will extend inwardly of the housing 1 until it registers with the corresponding aperture 28' provided in the plate 21, and projecting slightly therebeyond (as shown in Fig. 3) in which position the aperture 33 is opposite the tip of the detent 22 so that under spring pressure it is automatically forced into said aperture 33. The detent 22, once having engaged in the aperture 33, the housing 1 cannot be disconnected from the standard 4 except by the insertion of a key (not shown) in the key-hole 34, said key being designed for insertion from the bottom of the housing, passing through the hole 34 and engaging the inclined lower face of the detent 22. It will be observed that the detent 22 may thus be rotated in a counter-clockwise direction about the stud 26, as shown in Figure 6, so that the end of the detent 22 is retracted from the aperture 33, and while the detent is thus held in that position by the key, an upward movement of the housing 1 is permitted so that the housing may be demounted as a complete assembly from the standard 4.

It will also be seen that the vertical downward movement of the housing on the standard is limited by a suitable bracket piece 35, said bracket being cooperatively positioned to abut against the plate 20 and preferably secured by a rivet 36 to one side of the angle iron forming said standard 4. Since the vertical upward movement of the housing 1 is limited by the latching mechanism in the manner just described, this arrangement restricts within fairly close limits the up and down movement of said housing on the standard 4, and the pressure of spring member 30 against the opposing side of the standard 4 prevents chattering between the housing and the standard.

It is obvious that the standard 4 may be permanently installed, separately of the housing 1, at any desired location on the highway and with the top of said standard at any height from the pavement. After suitable installation of the standard 4, the reflector unit may be placed upon the exposed end of said standard and moved downwardly thereon until it automatically becomes locked thereto by the latching mechanism.

From the foregoing the assembly and installation of the reflecting device will be easily understood. The demountable structure may be completely assembled at the factory and shipped separately from the standard for supporting the same. This assembled structure is comparatively light in weight and at the same time is sufficiently strong to resist deformation during installation and to withstand ordinary exposure to service conditions. However, should it become necessary to repair or replace either the standard or the reflector assembly, the fact that the assembly may be mounted and demounted as a complete unit enables quick replacement or repairs.

As road markers these devices are usefully installed in comparatively close succession along a roadside, their frequency depending upon the terrain and the contour of the road, being closer together, for example, on curves than on straight stretches of road. Being double faced they will be illuminated by the headlights of vehicles approaching in either direction. The proximity of the markers is such that several will be visible at one time and they thus at night serve to throw into relief the general contour of the highway.

Although the invention is characterized by simplicity of construction, changes may be made by those skilled in the art without departing from the spirit thereof. For example, the arrangement, number and size of the collimating lens units may be changed, but all such modifications as come within the scope of the appended claims are to be regarded as contemplated by the invention.

What is claimed is:

1. In an assembly for reflectors, a housing composed of a pair of duplicate sections made of sheet metal stampings and provided with abutting surfaces along their edges, said sections having aligned vertical openings formed transversely thereof and adapted to support reflecting units therein, resilient channel members, said sections being fastened together by the clasp formed by said channel members engaging grooves in a portion of the edges of said surfaces, cut-away portions on each edge of each of said sections forming stops against which the ends of said channel members register, the remainder of said abutting surfaces of each section being adapted to fit flush with the corresponding abutting surfaces of each other and constituting a closure for the top of the housing, a supporting standard for the housing, and means for securing said housing upon said standard.

2. An assembly for reflectors comprising a housing composed of two sections duplicates of each other and having their edges rolled to afford abutting surfaces when the sections are assembled with their edges opposing each other, clamping members adapted to register with the rolled edges of said sections for securing the latter together, the top portion of each of said sections having a plurality of aligned complementary apertures formed therein and adapted to receive reflecting units, reflecting units mounted in said apertures, resilient washers for yieldingly holding the reflector units in proper position when assembled, the lower portion of said sections tapering into a compartment of greater transverse dimension than the upper portion, said compartment having spaced bearing surfaces for the accommodation of plate members mounted therein and adapted to provide means for fastening the housing to a support, one of said plates having a latching mechanism for releasably securing the assembly to said support, and a spring member the ends of which are secured to said plates and adapted to exert a force between the housing and the support to prevent chattering between the housing and the support.

3. In an assembly for reflectors, a housing composed of a pair of duplicate sections made of sheet metal stampings and provided with abutting surfaces along their edges, said sections having aligned vertical openings formed transversely thereof and adapted to support reflecting units therein, resilient channel members, the lower portions of said edges of each section being rolled outwardly to form grooves in which the resilient channel members slide to their secured positions, the upper portion of said edges of each section being adapted to fit snugly the corresponding edges of each other and form a closure for the top of the housing, cut-away portions in each edge of each section between said lower and upper portions forming stops against which the ends of said channel members register, a supporting standard for the housing, and means for securing said housing upon said standard.

4. In an assembly for reflectors, a housing composed of a pair of duplicate sections made of sheet metal, said sections having their top portions of lesser transverse dimension than the lower portions, said top portions having aligned vertical openings formed transversely therein for the reception of reflecting units, a pair of bearing seats vertically spaced from each other formed in said enlarged lower portions, a pair of plates having aligned apertures therein, one of said plates being secured in each of said seats transversely of said housing, a supporting standard for the housing inserted into the aligned apertures in said plates, means for releasably securing said housing upon said standard, said means including a latching mechanism carried by one of said plates, and resilient members adapted to engage portions of the edges of said sections for holding said sections in an assembled position.

RICHARD W. LUCE.
      JOHN C. HAGGART, Jr.